United States Patent [19]

Isumi

[11] Patent Number: 5,815,816
[45] Date of Patent: Sep. 29, 1998

[54] METHOD FOR MANAGING COMMUNICATION CHANNELS IN MOBILE TELECOMMUNICATIONS SYSTEM AND RADIOTELEPHONE SYSTEM FOR USE THEREIN

[75] Inventor: Shinya Isumi, Onojo, Japan

[73] Assignee: Matsushita Electric Industrial Co., Ltd., Osaka, Japan

[21] Appl. No.: 654,808

[22] Filed: May 29, 1996

Related U.S. Application Data

[63] Continuation of Ser. No. 258,873, Jun. 13, 1994, abandoned.

[30] Foreign Application Priority Data

Jul. 13, 1993 [JP] Japan .................................. 5-173068

[51] Int. Cl.$^6$ ........................................................ H04Q 7/38
[52] U.S. Cl. ........................ 455/458; 455/445; 455/560; 455/567
[58] Field of Search ..................................... 455/403, 445, 455/422, 426, 458, 550, 560, 567, 527, 528

[56] References Cited

U.S. PATENT DOCUMENTS

| | | | |
|---|---|---|---|
| 4,700,374 | 10/1987 | Bini | 379/60 |
| 5,101,451 | 3/1992 | Ash et al. | 379/221 |
| 5,282,240 | 1/1994 | Buhl et al. | 379/59 |
| 5,311,571 | 5/1994 | Pickert | 379/58 |
| 5,319,699 | 6/1994 | Kerihuel et al. | 379/58 |
| 5,353,340 | 10/1994 | Kunz | 379/60 |
| 5,371,780 | 12/1994 | Amitay | 379/58 |

OTHER PUBLICATIONS

"System 900: The ISDN Approach to Cellular Mobile Radio", M. Wizgall, et al., Electrical Communication, vol. 63 #4, 1989.

*Primary Examiner*—Dwayne D. Bost
*Assistant Examiner*—William G. Trost
*Attorney, Agent, or Firm*—Lowe Hauptman, Gopstein Gilman & Berner

[57] ABSTRACT

When a base station of a digital radiotelephone system receives, through a circuit interface unit of the base station, a call setup message for a radio subordinate unit from a radio control station, an incoming call signal is transmitted to the radio subordinate unit through a radio interface unit of the base station, under control of a control unit of the base station, without performing an acquisition of a circuit communication channel between the radio control station and the base station. Thereafter, when a radio link setup message, an incoming call response, a call proceeding message or an authentication response message is provided by the radio subordinate unit, it is known that the radio subordinate unit is present in a radio area of the base station, and the circuit communication channel is acquired under the management of a communication channel management of the base station. Therefore, even when many incoming call signals are concentrated at the base station, a circuit communication channel can be reliably and efficiently acquired.

14 Claims, 8 Drawing Sheets

FIG. 2

RSU : RADIO SUBORDINATE UNIT
BS : BASE STATION
RCS : RADIO CONTROL STATION
GCS : GATEWAY CONTROL STATION
MLMS : MOBILE LOCATION
    MANAGEMENT STATION
ACM : ADDRESS COMPLETE
    MESSAGE
OPG : CALL PROGRESS MESSAGE
PROC : PROCEEDING
CCMC : CIRCUIT COMMUNICATION
    CHANNEL
MLIC : MOBILE LOCATION
    INFORMATION CONFIRMATION
MLIR : MOBILE LOCATION
    INFORMATION RESPONSE
RLSRQ : RADIO LINK SETUP REQUEST
RLSRS : RADIO LINK SETUP RESPONSE

FIG. 4

MLIP : MOBILE LOCATION INFORMATION PORTION
FPN : FIXED-POSITION NETWORK

1 FRAME (nB+D)

FIG. 7(B)

1 FRAME (CCH+nTCH)

FIG. 7(C)

| NO. OF RSU | MOBILE LOCATION AREA NO. | ROUTE NO. | SERVICE CLASS RANK |
|---|---|---|---|
| 123-4567 | xx | 01 | 1 |
| : | : | : | : |

FIG. 8

| CHANNEL NO. | USAGE STATE | USER | FORWARD LINK POINTER | BACKWARD LINK POINTER |
|---|---|---|---|---|
| 1 | BUSY | CALL REF. 1 | NONE | NONE |
| 2 | BUSY | CALL REF. 2 | NONE | NONE |
| 3 | BUSY | CALL REF. 3 | NONE | CHANNEL NO. 4 |
| 4 | BUSY | CALL REF. 3 | CHANNEL NO. 3 | NONE |
| 5 | IDLE | NONE | NONE | NONE |
| : | : | : | : | : |

REF : REFERENCE

METHOD FOR MANAGING COMMUNICATION CHANNELS IN MOBILE TELECOMMUNICATIONS SYSTEM AND RADIOTELEPHONE SYSTEM FOR USE THEREIN

This application is a continuation of application Ser. No. 08/258,873 filed Jun. 13 1994, now abandoned.

BACKGROUND OF THE INVENTION

1. Field of The Invention

This invention relates to a radiotelephone system for use in a mobile telecommunications system and a method for managing communication channels or paths in the mobile telecommunications system. More particularly, this invention relates to a method for managing communication channels at the time of controlling incoming calls at a base station or the like of a mobile telecommunications system and to a radiotelephone system for use therein.

2. Description of The Related Art

Radiotelephones for use in mobile telecommunications systems have come into wide use, rapidly, owing to serviceability thereof. At present, most of mobile telecommunications systems are, still, of the analog type. However, recent advances in digital radio techniques and audio coding techniques result in that the efficiency in utilization of frequencies in digital mobile telecommunications systems becomes higher than that in utilization of frequencies in analog ones. Moreover, recent progress in integration techniques has enabled the down-sizing of a mobile telecommunications system and realized a high-speed processing in the system. These have led to an occurrence of a surge of digitalization of mobile telecommunications systems. Thus the construction of digital or hybrid mobile telecommunications systems is now in progress.

Meanwhile, in the present situation, automobile telephones, portable telephones and cordless telephones are widely used for land-mobile telecommunications systems; ship telephones for maritime mobile telecommunications systems; and aircraft radio telephones for aeronautical mobile telecommunications systems. Namely, the construction and users of mobile telecommunications system, as well as services provided by mobile telecommunications systems, vary with the fields of utilization thereof. Generally, mobile telecommunications systems are characterized in that communications can be established between places where mobile radio communications terminals can move. However, under the existing conditions, the systems do not make a good use of such a characteristic. In this sense, a pressing need is to unify the mobile communication services. This can be achieved by introducing digital mobile telecommunications systems, which generally have high extensibility, into the various fields of utilization.

Further, there are two kinds of mobile telecommunications, namely, a voice transmission type and a data transmission type. Moreover, the fusion of mobile telecommunications systems of the data transmission type and the voice transmission type is now being advanced. For example, there appears a facsimile system, a personal computer communication system or the like utilizing an automobile telephone, a portable telephone or the like which is a device for use in a mobile telecommunications system of the voice transmission type. It is expected that the fusion of mobile telecommunications systems of the data transmission type and the voice transmission type is further promoted in the future. Digital mobile telecommunications systems are expected to be very much suitable for such a fusion of the systems.

Other characteristics of a digital mobile telecommunications system reside in that a digital mobile telecommunications system excels in quality of a signal transmitted, that a more advanced radio circuit control operation (for instance, what is called a "hand-over" (namely, a hand-off) from an area or zone to another area) can be performed by employing a time division multiplex system and that thus, what is called a "radio area" (namely, a radio zone) corresponding to each base station can be made to be very small. Therefore, the digital mobile telecommunications system excels in efficiency of usage of frequency exceedingly. Consequently, digitalization is inevitable for a mobile telecommunications system which is expected to be popular and to want for frequencies. As described above, the present invention relates to a method for managing a communication channel at the time of controlling incoming calls at a base station or the like of such a digital mobile telecommunications system and to a radiotelephone system for use therein.

Figure 4:
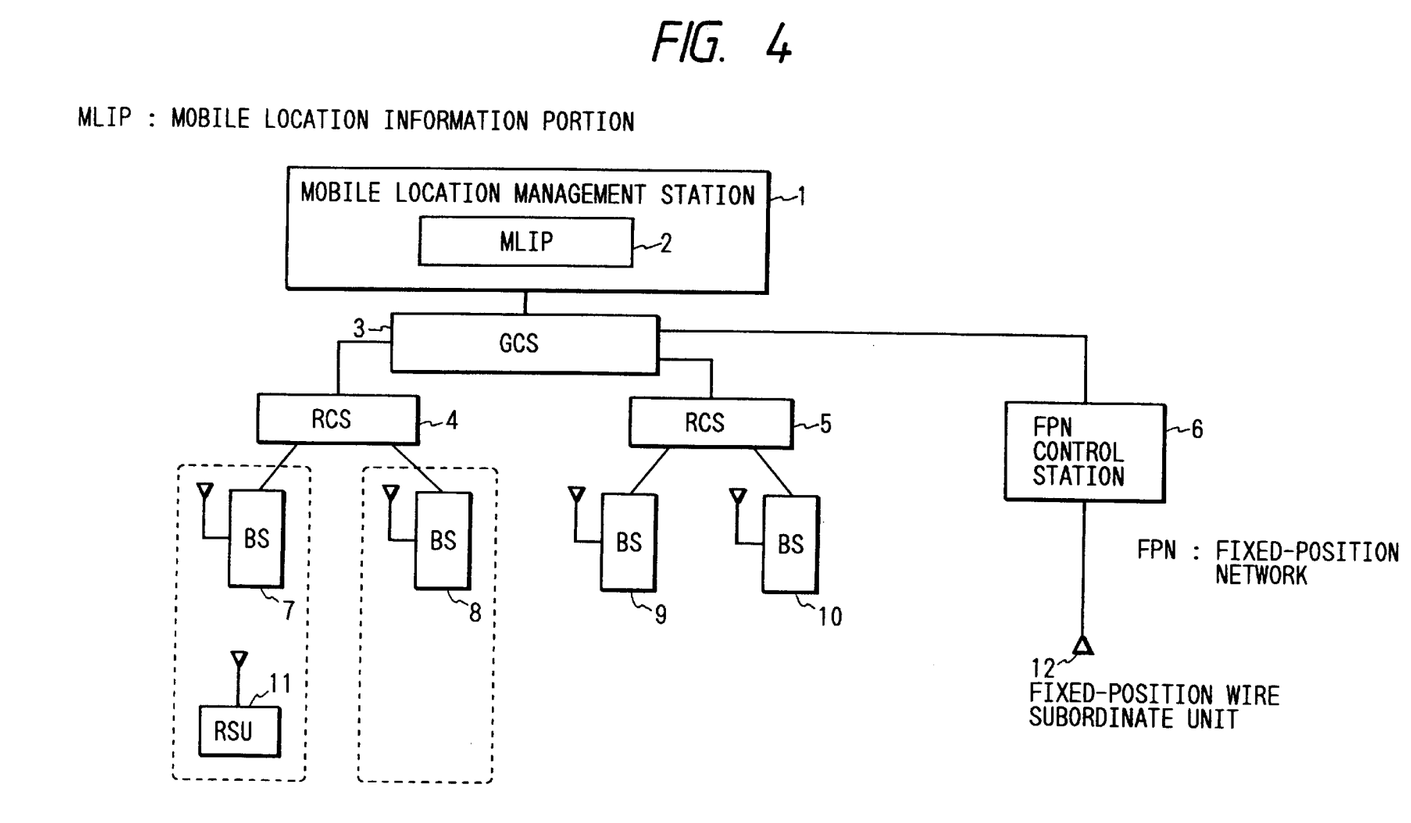
FIG. 4 is a schematic block diagram for illustrating the configuration of a mobile telecommunications system.

FIG. 4 illustrates the configuration of such a mobile telecommunications system. In this figure, reference numeral 1 designates a mobile location management station. This mobile location management station 1 has a mobile location information portion 2 for storing as a data base the telephone number of a radio subordinate (or slave) unit 11 (for example, a portable telephone), the area number (hereunder sometimes referred to as a mobile area number) of a mobile area in which the radio subordinate unit 11 is present (incidentally, the location of the subordinate unit 11 is "registered"), and route information to be used for connecting a circuit or line of a fixed-position telephone network or the like to a base station 7 for performing operations for controlling the mobile area. Further, this mobile location management station 1 performs operations of registering the location of the radio subordinate unit 11 and managing the route information or the like corresponding to the mobile area according to data stored in the mobile location information portion 2.

Reference numeral 3 denotes a gateway control station for carrying out a gateway connection control operation to be performed among radio telephone networks and fixed-position telephone network which have been already established. Further, reference numerals 4 and 5 designate radio control stations for controlling a connection between the radio subordinate unit 11 and another unit. Meanwhile, the gateway connection control operation is the following operation. Namely, in case where the call is transmitted from a telephone network, to which the gateway control station belongs, to another telephone network, (that is, in case where the call is made between a fixed-position telephone network for controlling an exchange operation on wire telephones and a radio telephone network or between radio telephone networks,) the transit of the call is performed and the telephone networks are connected to each other. Further, in the gateway connection control operation, if the destination of the call (namely, the slave station) is the radio subordinate unit 11, the gateway control station 3 retrieves the location of the radio subordinate unit 11 and controls an operation of connecting the call to the retrieved location thereof. Reference numeral 6 denotes a fixed-position telephone network control station for controlling a connection between a fixed-position wire subordinate unit 12 and another unit; and 7 to 10 base stations which correspond to master or superior units of the subordinate unit 11. The fixed-position telephone network control station 6 is provided with a switching system for performing an exchange control operation to enable the wire telephone to transmit and receive a call. The base stations 7 to 10 correspond to master units of a radio telephone system and serve as control portions for establishing circuits therefrom to the radio control stations 4 and 5 and a circuit therefrom to the radio subordinate unit 11.

Figure 5:
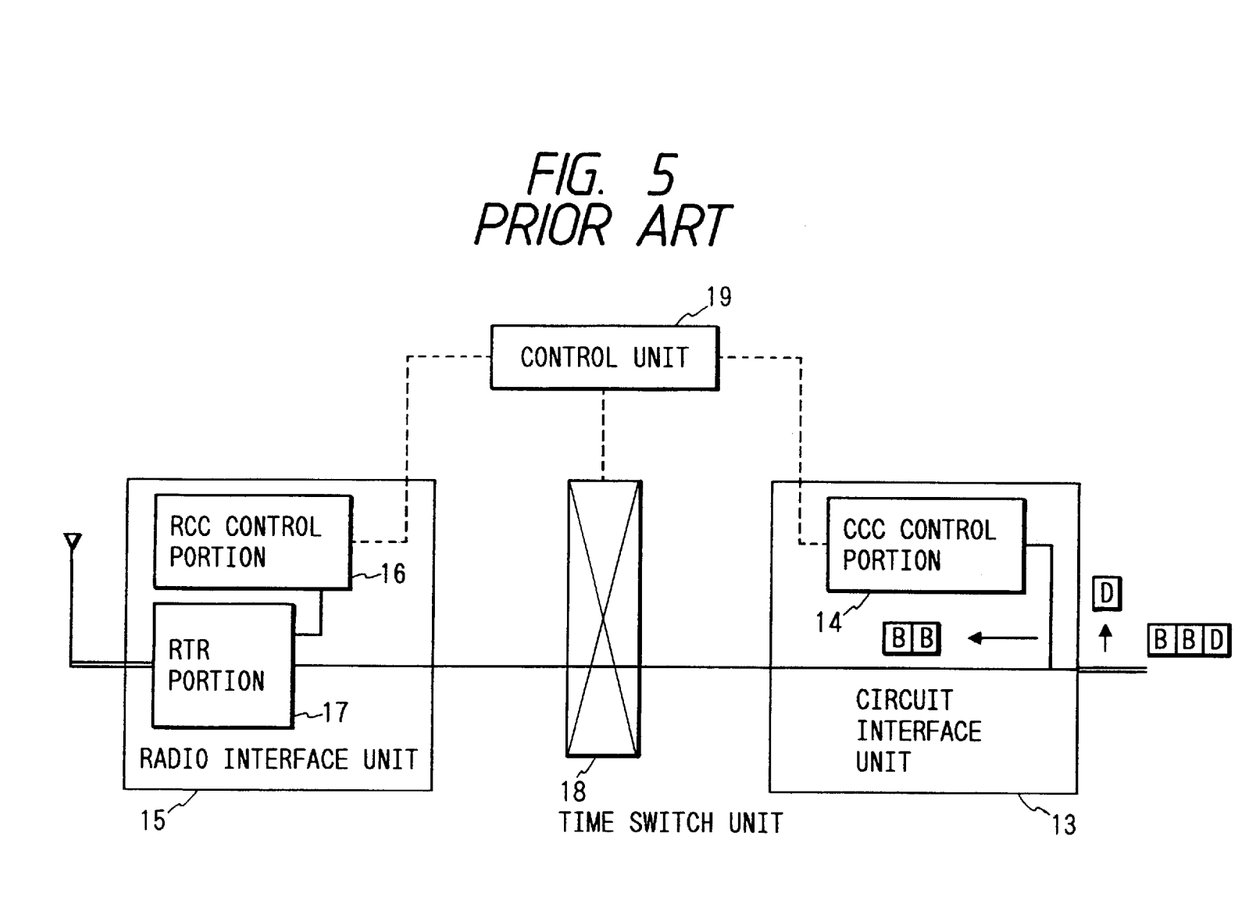
FIG. 5 is a schematic block diagram for illustrating the configuration of the radiotelephone unit of the conventional mobile telecommunications system.
Figure 7A:
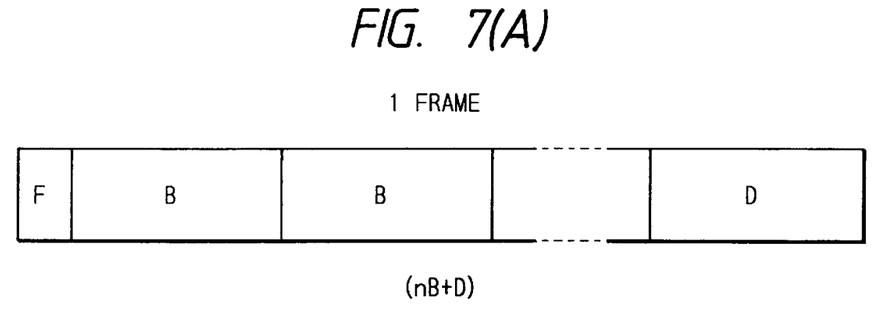
FIG. 7(A) is a diagram for illustrating the frame structure employed for transmission of data on a digital circuit.

FIG. 5 is a schematic block diagram for illustrating the configuration of a radiotelephone unit provided in each of the base stations 7 to 10 of the mobile telecommunications system. In this figure, reference numeral 13 designates a circuit interface unit which serves as a physical and logical interface between the base station and each digital circuit. Each digital circuit terminates at this circuit interface unit 13, physically. Further, the circuit interface unit 13 is provided with a control unit for performing the functions of control level 2 of protocol (namely, layer 2 or the link control layer) of the open systems interconnection (OSI) model which has seven layers of protocol. Although this example performs the functions of control levels 1 and 2 (namely, layer 1 or the physical (control) layer and the link control layer) of the OSI model, the circuit interface unit 13 may be adapted to perform all of (or part of) the functions of control level 3 (namely, layer 3 or the network layer) of the OSI model. Incidentally, the functions of control level 2 are to perform a detection of an error in control data to be transmitted on and received from a control channel and further control a retransmission of control data if an error has been detected, in order to transmit and receive normal control data. Further, the functions of control level 3 relate to information to be transmitted on the D-channel between networks by performing the functions of control levels 1 and 2 of the OSI model. Namely, control level 3 of protocol governs the format of such information to be transmitted on the D-channel and defines the procedure of controlling circuit switched calls. Reference numeral 14 denotes a circuit-control-channel control portion performing the functions of control level 2 of the OSI model to transmit and receive control channel data through digital circuits. Hereunder, a frame structure employed for transmission of data on a digital circuit will be described for explaining the control channel. This frame is transmitted by using a time division multiplex system. As is seen from FIG. 7(A), this frame consists of F-bit, data stream of B-channel and data stream of D-channel. Further, the F-bits are used for achieving a frame alignment or synchronization. Moreover, the B-channel is a communication channel used to transmit information on voice and/or data. Furthermore, the D-channel is a channel employed to transmit control data used for performing the connection and disconnection between the digital circuit and the base station. Namely, the D-channel corresponds to the control channel. In case of the unit of FIG. 5, 2 channels are used as the B-channel and a single channel is employed as the D-channel. However, the number of channels employed as the B-channel may be n (incidentally, n is a positive integer (for instance, 23 or 30)) depending on a transmission speed.

Reference numeral 15 designates a radio interface unit which serves as a physical and logical interface between the radio circuit and the base station. The radio circuit terminates at the radio interface unit 15. Further, the radio interface unit 15 has a control portion which performs the functions of control level 2 (namely, layer 2) of the protocol of the OSI model having logical seven layers and may be adapted to perform all (or a part) of the functions of layer 3. Similarly as in case of the digital circuit portion, the functions of layer 2 to be performed by this control portion are to control a detection of an error in control data and a retransmission of control data. Furthermore, reference numeral 16 denotes a radio-control-channel control portion for transmitting and receiving data on a radio control channel.

Figure 7B:
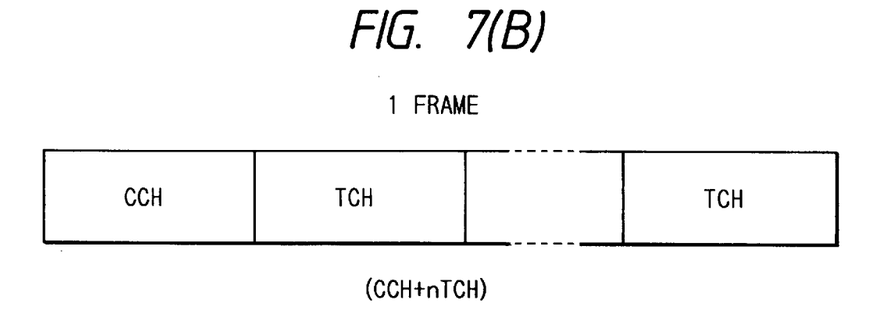
FIG. 7(B) is a diagram for illustrating the frame structure employed for transmission of data on a radio circuit.

Hereunder, a frame structure employed for transmission of data on a radio circuit will be described. This frame is transmitted on the radio circuit by a time division multiplex system. As is illustrated in FIG. 7(B), 1 frame is comprised of a field of data to be transmitted on a channel CCH and a plurality of slots, that is, fields of data to be transmitted on a channel TCH. The CCH is a control channel used to transmit control data used for the connection and disconnection of the radio circuit. Further, the channel TCH is a information channel used to transmit information, namely, voice and data. However, in some cases, control data to be transmitted on the channel CCH comes to be transmitted on or received from the channel TCH from a certain point of time. The radio-control-channel control portion 16 performs operations of detecting an error in the control data and controlling the retransmission thereof (namely, the functions of layer 2). Thus normal control data can be transmitted and received. Reference numeral 17 designates a radio transmission/reception portion for transmitting a radio wave representing information such as voice and control data and for receiving an electric signal representing information; and 18 a time switch unit for performing a switching between a communication channel at the side of, namely, connected to a circuit interface unit (hereunder sometimes referred to simply as a circuit communication channel) and another communication channel at the side of, namely, connected to a radio interface unit (hereunder sometimes referred to simply as a radio communication channel). Namely, this time switch unit 18 is a time division switch for controlling the connection of an up-stream communication channel highway (in the direction from the radio interface unit 13 to the radio interface unit 13), as well as that of a down-stream communication channel highway (in the direction from the circuit interface unit 13 to the radio interface unit 15). Reference numeral 19 denotes a control unit for setting a circuit at the side of the circuit interface unit according to control data transmitted and received by the circuit-control-channel control portion 14 of the circuit interface unit 13, for setting a radio circuit according to control data transmitted and received by the radio-control-channel control portion 16 of the radio interface unit 15 and for enabling the control of an originating-call from and an incoming-call to the radio subordinate unit 11 by controlling the time switch unit 18 to connect a communication channel highway between the circuit and the radio circuit.

Figure 6:
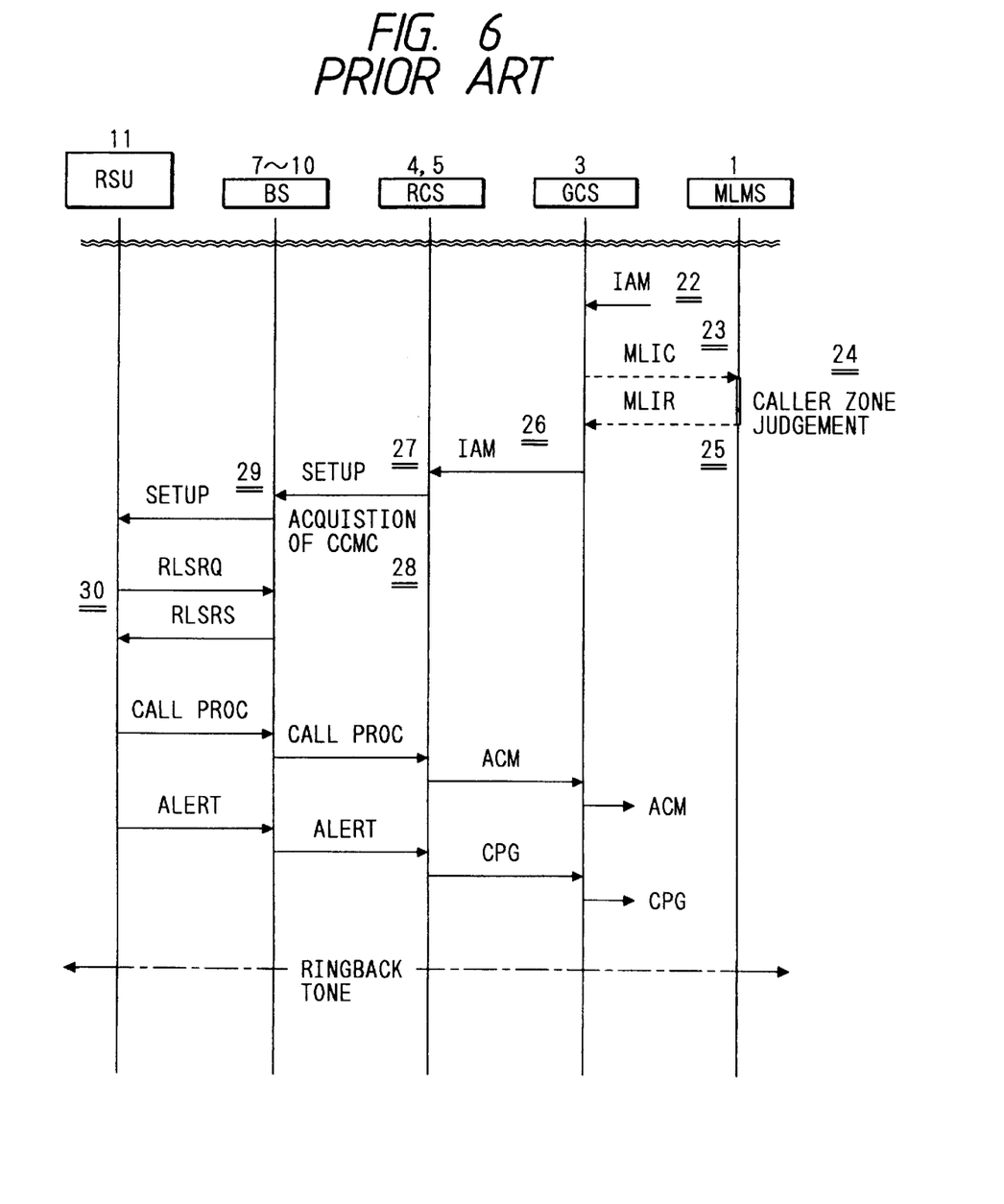
FIG. 6 is a sequence chart for illustrating an example of an incoming-call control sequence to be performed by the radiotelephone unit of FIG. 5.

Hereinafter, an operation of the radiotelephone unit of the mobile telecommunications system (especially, the base station) with the above described configuration will be described by referring to an incoming-call control sequence chart of FIG. 6. In case of the system of FIG. 4, when a call is originated from the fixed-position wire subordinate unit 12 to the radio subordinate unit 11, the fixed-position wire subordinate unit 12 (connected to a subscriber's line) transmits a call setup message (hereunder sometimes referred to simply as a setup message) containing the telephone number (namely, the called number) of the radio subordinate unit 11 to the fixed-position telephone network control station 6 by using the control channel. As stated above, this control channel is the D-channel of FIG. 7(A). When receiving the call setup message from the fixed-position wire subordinate unit 12, the fixed-position telephone network control station 6 judges that there is a call originated therefrom. Then, the fixed-position telephone network control station 6 transmits a call setup message containing telephone number information to the gateway control station 3 by using the control channel (sequence 22). This call setup message is transmitted and received as an initial address message (IAM) among the fixed-position telephone network control station 6, the gateway control station 3 and the radio control station 4. When receiving this IAM, the gateway control station 3 transmits a mobile location information confirmation message to the mobile location management station 1, for the purpose of judging in what mobile area a called party is located and through what route the originator is connected to the originator, to thereby perform a mobile location information confirmation operation (sequence 23).

Figure 7C:
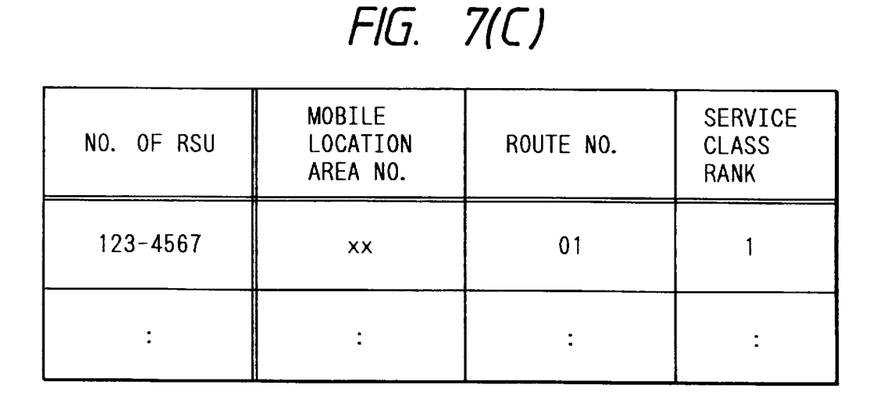
FIG. 7(C) is a diagram for illustrating the structure of the data base of the mobile location information portion of the system of FIG. 4.

The mobile location management station 1 accesses the mobile location information portion 2 with the intention of performing a mobile location information confirmation operation. FIG. 7(C) illustrates the structure of the data base of the mobile location information portion 2. Further, as is shown in this figure, data indicating the telephone number of the radio telephone subordinate unit 11, data representing mobile area numbers and data indicating route numbers are stored in the data base. Thus the mobile area number of a mobile area, in which the called radio subordinate unit 11 is located, is retrieved (sequence 24). Then, the mobile location management station 1 transmits to the gateway control station 3 a mobile location information response message including a route number used for transmitting a call to the mobile area corresponding to the retrieved mobile area number. This is a mobile location information response operation (sequence 25). Incidentally, as the radio telephone subordinate unit 11 moves, the mobile area of the unit 11 changes every moment. Accordingly, the data stored in the mobile location information portion 2 is updated successively. Further, the structure illustrated in FIG. 7(C) is merely an example of the structure of the data base. Namely, the structure of the data base may be modified variously if necessary.

Then, the gateway control station 3 transmits an IAM (sequence 26) and perform a call setup procedure to set up a call to the route (for example, a radio network of another region) corresponding to the route number contained in the mobile location information response message. Subsequently, the radio control station 4 receives the IAM from the gateway control station 3 and Judges that an incoming-call occurs. Then, the radio control station 4 transmits a call setup message to all of the base stations 7 and 8 (sequence 27) to start controlling an incoming-call. Hereunder, an incoming-call operation of the base station 7 having received the call setup message will be described.

When the base station 7 receives a call setup message for establishing a circuit, the control unit 19 of FIG. 5 receives the call setup message, which is control data for the circuit, through the circuit control channel control portion 14 of the circuit interface unit 13. In this case, the call setup message is received from the radio control station 4. Thus the control unit 19 judges that this is an incoming-call and moreover, the acquisition of a circuit communication channel is effected (sequence 28). Here, the acquisition of a communication channel is to put a communication channel indicated by a channel identifier of the call setup message into an occupied (or blocked) state thereof. Practically, the acquisition of a communication channel is to register the communication channel in a channel table provided in the control unit 19 as being busy or occupied. Further, the selection of one of communication channels to be used is performed by the radio control station 4 which adds the channel identifier to the call setup message. When receiving this call setup message, the base station passively registers the communication channel indicated by the channel identifier as being in an occupied state. Subsequently, the control unit 19 transmits to the radio subordinate unit 11 via the radio-control-channel control portion 16 and the radio transmission/reception portion 17 of the radio interface unit 15 a call setup message indicating that this is an incoming-call to the radio subordinate unit 11 (sequence 29). Here, if the called radio subordinate unit 11 is located in the mobile area corresponding to the calling base station 7 as illustrated in FIG. 4, the called radio subordinate unit 11 performs a radio-circuit setup procedure to respond to the incoming-call. First, the unit 11 transmits a radio link setup request message to the base station 7 through the control channel, for the purpose of setting up a communication channel for transmitting a logical message on the radio circuit. This is a radio-link setup request operation. When receiving the radio-link setup request message from this radio subordinate unit 11, the base station 7 transmits a radio-link setup response message to this radio subordinate unit 11. This is a radio-link setup response operation. When the radio subordinate unit 11 receives this radio-link setup response message, a communication channel for transmitting a logical message is established. Namely, a radio link is established between the radio subordinate unit 11 and the base station 7 (sequence 30). Thereafter, an ordinary incoming-call sequence is performed. Namely, the radio subordinate unit 11 transmits a call proceeding message to the base station 7 and performs a call proceeding operation. In response to this message, the base station 7 transmits a call proceeding message to the radio control unit 4 and also performs the call proceeding operation. When receiving the call proceeding message; the radio control station 4 transmits to another base station 8 a release message indicating that an incoming-call sent from the fixed-position wire subordinate unit 12 is terminated. The base station 8 receives the call setup message from the radio control station 4 and acquires a circuit similarly as in case of the base station 7. When receiving the release message, the base station 8 releases a circuit communication channel and enters a null state. Namely, in response to the release message, the base station 8 releases the circuit communication channel by registering the channel once more, which has been registered in the channel table of the control unit 19 as being occupied, as being unoccupied, and then enters the stand-by state.

However, in case of a conventional method for managing a communication channel, when receiving an incoming-call, a circuit is registered from the viewpoint of an internal processing in each of the base station corresponding to a radio control station as becoming busy or occupied logically. Thus the communication channel connected to the circuit interface unit is acquired. Thus, even in case of the base station 8 in which the radio subordinate unit 11 is absent actually, the circuit communication channel is treated as busy. Namely, in case of the base station 8, although the circuit communication channel is unused actually, logical data indicating that the circuit communication channel is busy is registered in the channel table. Sometimes, the channel table indicates that in the base station, there are no idle circuit communication channels.

For example, it is assumed that the number of circuit communication channels provided between the radio control station 4 and the base station 7 is two. In such a case, if two incoming-calls are caused in the radio control station 4, all of the circuit communication channels of the base stations 7 and 8 are registered in the channel table of the control unit 19 as being busy. Thus the communication channels are treated as completely occupied (or blocked). This results in that all of the base stations 7 and 8 belonging to the radio control station 4 can not transmit and receive a call until the incoming-calls are terminated. Consequently, the conventional system has a drawback in that the circuit usage efficiency is extremely decreased. The present invention is accomplished to eliminate the drawback of the conventional system.

SUMMARY OF THE INVENTION

It is, therefore, an object of the present invention to provide a method for managing a radiotelephone system, which can prevent a circuit from being unnecessarily occupied and can increase the circuit usage efficiency.

It is another object of the present invention to provide a radiotelephone system for use in performing such a method.

To achieve the foregoing object, a method of the present invention for managing a radiotelephone system is characterized in that an incoming-call signal is transmitted through a radio transmission/reception portion of a radio interface unit without performing an acquisition of one of circuit communication channels at the time of receiving a call setup message when a base station of a mobile telecommunications system receives a call setup message to a radio subordinate unit through a circuit-control-channel control portion and that one of the circuit communication channels is acquired through a communication channel management unit at a moment, at which it is known that the radio subordinate unit is present in what is called a radio area of the base station (namely, in an area governed by the base station).

Further, in case of a preferred embodiment of this method for managing a radiotelephone system according to the present invention, the moment, at which it is known that the radio subordinate unit is present in the radio area of the base station, is a moment, at which a radio link setup request message is issued from the radio subordinate unit.

In case of another preferred embodiment of this method for managing a radiotelephone system according to the present invention, the moment, at which it is known that the radio subordinate unit is present in the radio area of the base station, is a moment, at which an incoming call response message is issued from the radio subordinate unit.

In case of a further preferred embodiment of this method for managing a radiotelephone system according to the present invention, the moment, at which it is known that the radio subordinate unit is present in the radio area of the base station, is a moment, at which a call proceeding message is issued from the radio subordinate unit.

In case of a still another preferred embodiment of this method for managing a radiotelephone system according to the present invention, the moment, at which it is known that the radio subordinate unit is present in the radio area of the base station, is a moment, at which an authentication response message is issued from the radio subordinate unit.

In case of yet another preferred embodiment of this method for managing a radiotelephone system according to the present invention, which further comprises the steps of causing the communication channel management unit to make a judgement on the usage states of the circuit communication channels, when the base station of the mobile telecommunications system receives the call setup message, and of acquiring one of the circuit communication channels at a moment when the communication channel management unit judges that the number of idle ones of the communication channels is large.

Moreover, in accordance with another aspect of the present invention, there is provided a method for managing a radiotelephone system, which comprises the steps of temporarily acquiring one of the circuit communication channels when a base station of a mobile telecommunications system receives a call setup message to a radio subordinate unit through a circuit-control-channel control portion, of transmitting an incoming call signal to the radio subordinate unit through a radio transmission/reception portion of a radio interface unit, of releasing the acquired circuit communication channel if it is not known within a predetermined time whether or not the radio subordinate unit is present in a radio area of the base station, and of acquiring the circuit communication channel again through a communication channel management unit at a moment, at which it is known that the radio subordinate unit is present in the radio area of the base station.

In case of a preferred embodiment of this method for managing a radiotelephone system according to the present invention, which further comprises the step of registering a priority of each radio subordinate unit, wherein in the step of temporarily acquiring the circuit communication channel, the circuit communication channel is acquired only when the called radio subordinate unit has a high priority.

Furthermore, in accordance with a further aspect of the present invention, there is provided a radiotelephone system, which comprises a base station of a mobile telecommunications system including a circuit interface unit having a circuit-control-channel control portion for transmitting and receiving data through a control channel on a digital circuit, a radio interface unit having a radio transmission/reception portion for transmitting voice and control data as radio waves and for receiving the voice and control data as electric signals, a time switch unit for switching a current communication channel between a circuit communication channel and a radio communication channel, and a control unit for controlling the circuit interface unit, the radio interface unit and the time switch unit to perform a transmission of a call to and a reception of a call from the radio subordinate unit, and further comprises a communication channel management unit for transmitting an incoming call signal through the radio transmission/reception portion of the radio interface unit to the base station, without performing an acquisition of one of circuit communication channels at the time of receiving a call setup message, when the base station receives a call setup message to a radio subordinate unit through the circuit-control-channel control portion and of acquiring one of the circuit communication channels through the communication channel management unit at a moment, at which it is known that the radio subordinate unit is present in a radio area of the base station.

Thus, in accordance with the present invention, an idle circuit communication channel is acquired by the communication channel management unit, which managing how circuit communication channels are used, at the moment when the presence of the called radio subordinate unit is known. Therefore, only the base station corresponding to the radio area, in which the called radio subordinate unit is present actually, acquires a circuit communication channel. As the result, unnecessary occupation of circuit communication channels does not occur. Consequently, the circuit usage efficiency of the entire system can be increased extremely. Moreover, the serviceability can be also improved.

Further, the moment at which the actual presence of the called radio subordinate unit is known is a time at which a radio link setup request message, an incoming call response message, a call proceeding message or an authentication response message is issued. Thus, the system can surely make a judgement on the presence of the called radio subordinate unit in the radio area.

Alternatively, when receiving an incoming call, an idle circuit communication channel is tentatively acquired for a predetermined period of time. Further, the acquired circuit communication channel is released if it is not known within the predetermined period of time whether or not the called radio subordinate unit is present actually in the corresponding radio area. In contrast, if the actual presence of the called radio subordinate unit in the corresponding radio area is known, the circuit communication channel is acquired again at the time when the actual presence of the called radio subordinate unit is known. Thus, only the base station corresponding to the radio area, in which the called radio subordinate unit is present actually, acquires a circuit communication channel. This can prevent an occurrence of unnecessary occupation of circuit communication channels. Moreover, the sureness of connection of the circuit communication channel can be increased. Furthermore, a circuit communication channel can be acquired efficiently. Consequently, the circuit usage efficiency of the entire system can be increased extremely. In addition, the serviceability can be also improved.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, the preferred embodiment of the present invention will be described in detail by referring to the accompanying drawings.

Figure 1:
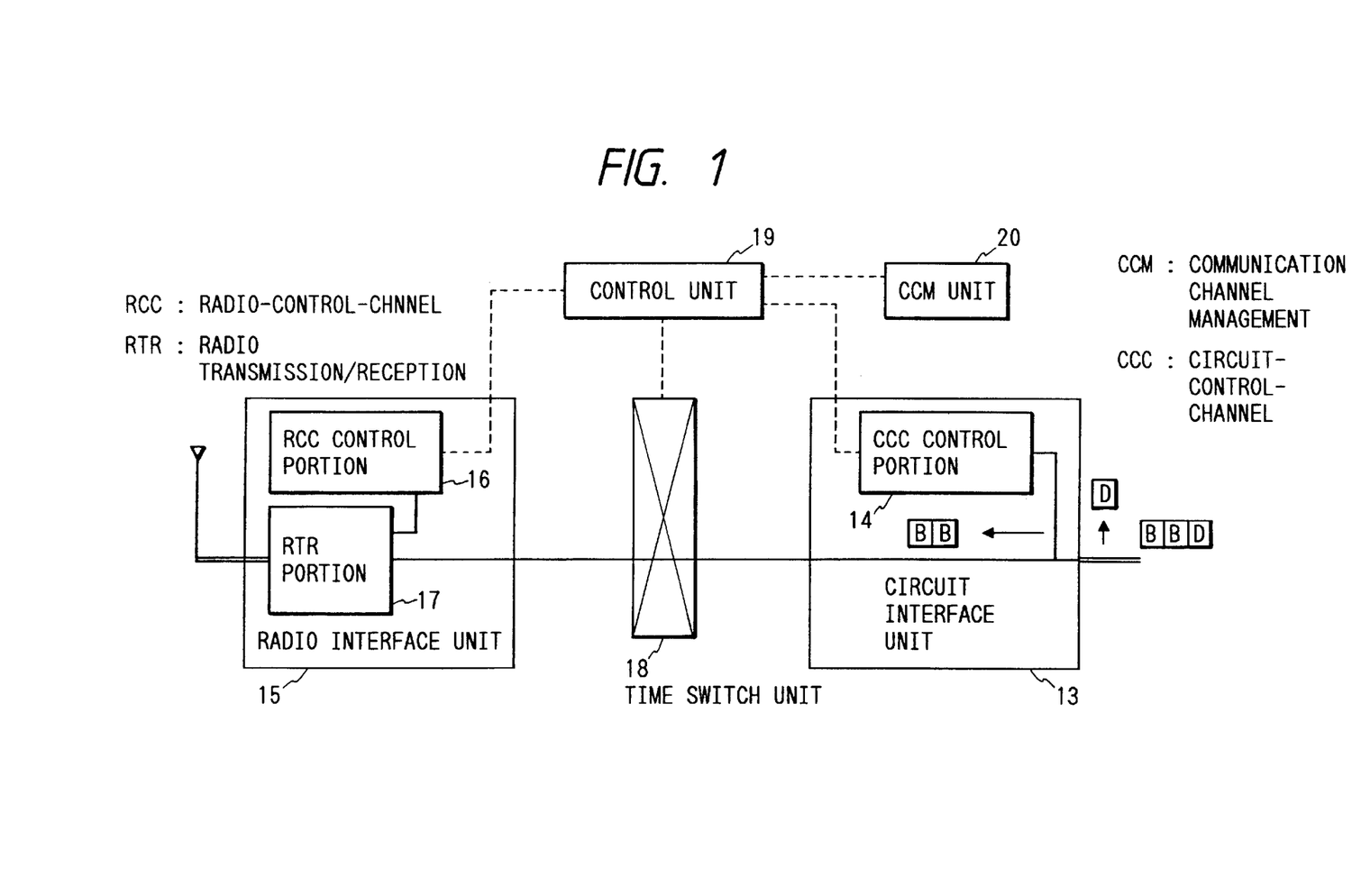
FIG. 1 is a schematic block diagram for illustrating the configuration of a radiotelephone system embodying the present invention.
Figure 8:
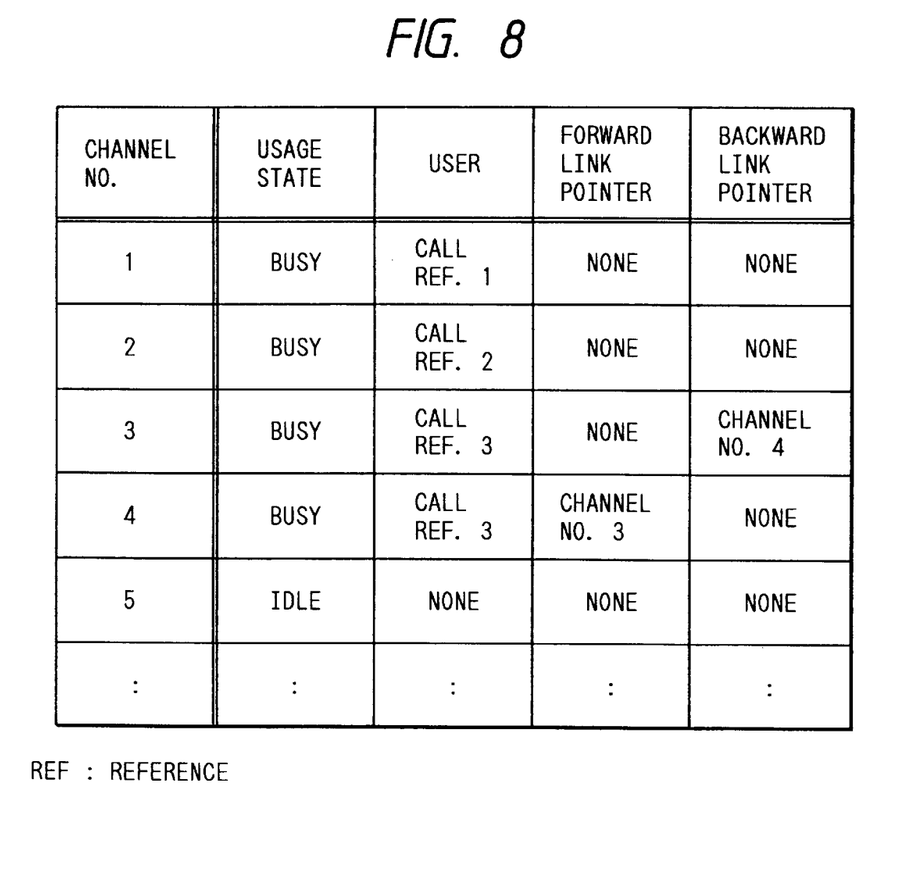
FIG. 8 is a diagram for illustrating the structure of a management table.

FIG. 1 is a schematic block diagram for illustrating the configuration of a radiotelephone system embodying the present invention. In this figure, reference numeral 20 designates a communication channel management portion for managing idle and busy communication channels. In FIGS. 1 and 4, composing elements (or blocks) having basically similar functions are designated by the same reference characters. However, note that the functions of the control unit 19 of the system of FIG. 1 are different from that of the conventional system of FIG. 4 in that the unit 19 of FIG. 1 does not perform the functions of referring to the channel table and managing what communication channels are idle and busy, which functions are carried out by the unit 19 of FIG. 4 and are effected by the communication channel management unit 20 in case of the system of FIG. 1 instead of the unit 19 of FIG. 4. Namely, in order to manage the assignment of communication channels, the communication channel management unit 20 actively manages the idle and busy states of the communication channels at the initiative of the base station. More particularly, decisions about which of the communication channels respectively corresponding to the fields of the frame should be used, as well as when a communication channel is acquired, are judged and made by the communication channel management unit 20. Namely, the selection of one of the communication channels, as well as the determination of the timing of an acquisition, is carried out by communication channel management unit 20 by referring to a management table as illustrated in FIG. 8 and reading information on busy channels. Further, the management table is updated by changing data representing the state of the selected idle communication channel as being busy. Thus the logical management of the usage of the communication channels are effected. Here, note that there are two methods for management of the communication channels. Namely, a first method is to assign only one of the B-channels of FIG. 7(A) to an incoming call. Further, a second method is to assign a bandwidth including a plurality of the B-channels to an incoming call. These methods are performed by the communication channel management unit 20. Incidentally, the second method is performed in case where the quantity of information to be transmitted or received is large and thus a large number of communication channels are necessary. In case of an example illustrated in FIG. 8, the channel assignment to an incoming call reference 3 is performed by assigning a bandwidth including two of the B-channels (namely, in this case, channel reference 3 and channel reference 4) to the incoming call reference 3. As illustrated in this figure, the forward-link-pointer of the channel No. 3 indicates "none" in this case. Further, the backward-link-pointer of the channel No. 3 indicates "the channel No. 4". Thus, it turns out that the channel No. 3 does not link with the channel No. 2 and but links with the channel No. 4. Moreover, the forward-link-pointer of the channel No. 4 indicates "the channel No. 3" in this case. Further, the backward-link-pointer of the channel No. 4 indicates "none". Thus, it further turns out that the bandwidth including the two channels (namely, the channel Nos. 3 and 4) is assigned to the incoming call No. 3.

Practically, a notification of the assignment is performed between the radio control station and the base station by utilizing a channel identifier contained in messages (namely, a setup message and a call proceeding message) transmitted between the base station 7, 8, 9 or 10 and the radio control station 4 or 5. Further, the notification of the assignment is sent to the radio control stations 4 and 5. The channel identifier represents information indicating which of channels is used. Moreover, the channel identifier is sent through the control channel therebetween. As described above, the active management of communication channels is performed in the base stations 7 to 10 to perform the selection of a communication channel and to control the timing of acquisition of a communication channel. Therefore, the control operation of the entire mobile telecommunications system can be prevented from becoming so complex as in cases that the management of communication channels is carried out by another control station, for instance, the radio control station and the gateway control station. As the result, the processing to be performed in the entire system can be simplified. Thus, this embodiment of the present invention has a technical merit in that the processing efficiency can be improved.

Figure 2:
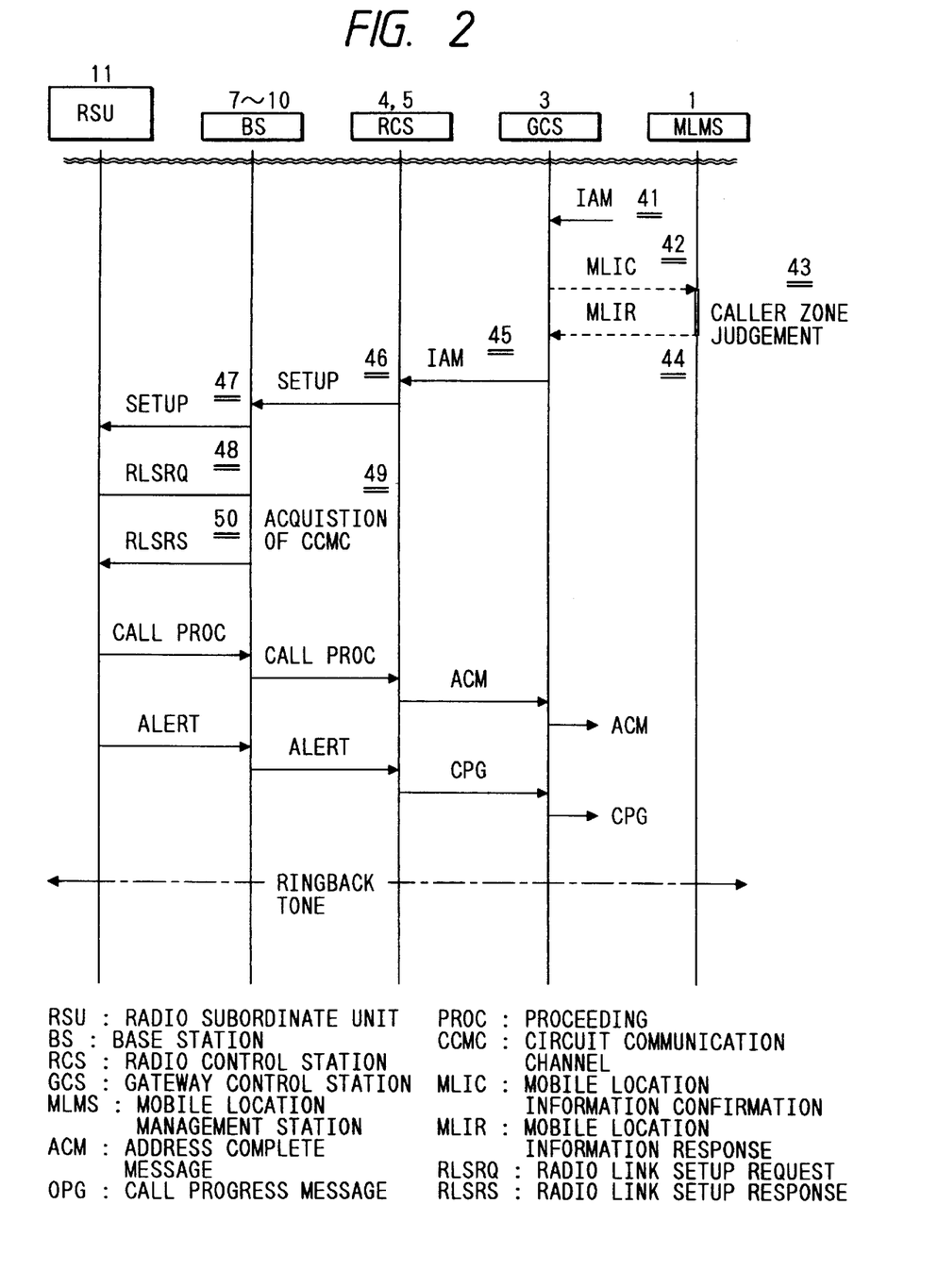
FIG. 2 is a sequence chart for illustrating an example of an incoming-call control sequence to be performed by the radiotelephone system of FIG. 1.

Next, an incoming-call control operation of the radiotelephone system will be described hereinbelow by referring to FIG. 2, which is a sequence chart for illustrating the operation, and FIG. 4 which shows the configuration of the mobile telecommunications system.

In case of the system of FIG. 4, when a call is transmitted from the fixed-position wire subordinate unit 12 to the radio subordinate unit 11, the fixed-position wire subordinate unit 12 (connected to a subscriber's loop) transmits a call setup message containing the telephone number (namely, the called number) of the radio subordinate unit 11 to the fixed-position telephone network control station 6 by using the control channel. When receiving the call setup message from the fixed-position wire subordinate unit 12, the fixed-position telephone network control station 6 judges that there is a call sent therefrom. Then, the fixed-position telephone network control station 6 transmits a call setup message containing telephone number information to the gateway control station 3 by using the control channel (sequence 41). This call setup message is transmitted and received as an IAM among the fixed-position telephone network control station 6, the gateway control station 3 and the radio control station 4. When receiving this IAM, the gateway control station 3 transmits a mobile location information confirmation message to the mobile location management station 1, for the purpose of judging in what mobile area a called party is located and through which route the originator can be connected to the called party (or unit). Thus, a mobile location information confirmation operation is performed (sequence 42).

The mobile location management station 1 accesses the mobile location information portion 2 in order to perform a mobile location information confirmation operation. Further, the mobile area number of a mobile area, in which the called radio subordinate unit 11 is located, is retrieved (sequence 43). Then, the mobile location management station 1 transmits to the gateway control station 3 a mobile location information response message including a route number used for transmitting a call to the mobile area corresponding to the retrieved mobile area number. This is a mobile location information response operation (sequence 44). Then, the gateway control station 3 transmits an IAM (sequence 45) and perform a call setup procedure to establish a call to the route (for example, a radio network of another region) corresponding to the route number contained in the mobile location information response message. Subsequently, the radio control station 4 receives the IAM from the gateway control station 3 and judges that an incoming call occurs. Then, the radio control station 4 transmits a call setup message to all of the base stations 7 and 8 and starts controlling an incoming call (sequence 46). The afore-mentioned incoming-call operation is basically similar to that of the conventional system previously described. Thus, an operation of the base station 7, which has received the setup message, will be next described hereinbelow.

Namely, first, in the base station 7, the control unit 19 of FIG. 1 receives the call setup message, which is control data for the circuit, through the circuit control channel control portion 14 of the circuit interface unit 13. When receiving the call setup message, the control unit 19 judges that this is an incoming call. Thus, subsequently, the control unit 19 transmits to the radio subordinate unit 11 via the radio-control-channel control portion 16 and the radio transmission/reception portion 17 of the radio interface unit 15 a call setup message indicating that this is an incoming call to the radio subordinate unit 11 (sequence 47). If the called radio subordinate unit 11 is located in the mobile area corresponding to the calling base station 7 as illustrated in FIG. 4, the called radio subordinate unit 11 performs a radio-circuit setup procedure to respond to the incoming call. First, the unit 11 transmits a radio link setup request message to the base station 7 through the control channel, for the purpose of establishing a communication channel for transmitting a logical message on the radio circuit. This is a radio-link setup request operation. Then, the base station 7 receives the radio-link setup request message from this radio subordinate unit 11 (sequence 48). Further, in case of this embodiment, when the control unit 19 receives the radio link setup request message, the communication channel management unit 20 immediately performs the acquisition of an idle circuit communication channel (sequence 49). Because the radio subordinate unit 11 is not present in the area corresponding to the base station 8, a radio link setup request message is not transmitted therefrom and thus the acquisition of a circuit channel is not performed.

In the communication channel management unit 20, an idle circuit is retrieved by accessing a circuit communication channel management table which has a structure as illustrated in FIG. 8 and is used to manage the states of channels. If there is an idle channel, this channel is acquired. The acquisition of a channel is to register the acquired channel in the management table as being busy logically and to cause the communication channel management portion to notify the radio control station 4 of the fact that the channel become occupied or busy. Further, the communication channel management unit 20 writes "busy" in the column "STATE OF USAGE" of the management table and also writes No. of the incoming-call (hereunder referred to simply as the call No.) in the column "USER" thereof. In addition, in case where a bandwidth including channels is assigned to an incoming-call, the channel No. to be linked with the acquired channels are written into the column "FORWARD-LINK-POINTER" or "BACKWARD-LINK-POINTER". Incidentally, there is another case in which the word "busy" is written into the column "STATE OF USAGE" of the management table, similarly as in case of the acquisition of a channel. Temporary (or tentative) acquisition is such a case. Namely, when performing a temporary acquisition of a channel, this channel is temporarily registered in the management table as being busy logically, similarly as in case of the acquisition of a channel. This prevents the channel from being occupied by a call sent from a radio subordinate unit other than the called radio subordinate unit and a call sent from a telephone of another telephone network until the circuit communication channel is regularly acquired.

When a circuit communication channel is acquired, the control unit 19 transmits a radio link setup response message to the radio subordinate unit 11 through the radio interface unit 15 (sequence 50). After a radio link is established, an ordinary incoming-call sequence is performed. Namely, the radio subordinate unit 11 transmits a call proceeding message to the base station 7 and performs a call proceeding operation in accordance with standards. In response to this call proceeding message, the base station 7 further transmits a call proceeding message to the radio control station 4 and performs a call proceeding operation similarly. Furthermore, when receiving the call proceeding message, the radio control station 4 notifies the other base station 8 of the termination of the incoming call by sending a release message thereto. Then, the base station 8 receives the release message and moreover the control unit 19 puts the state of the call, which has been in an incoming state, back to null state.

Figure 3:
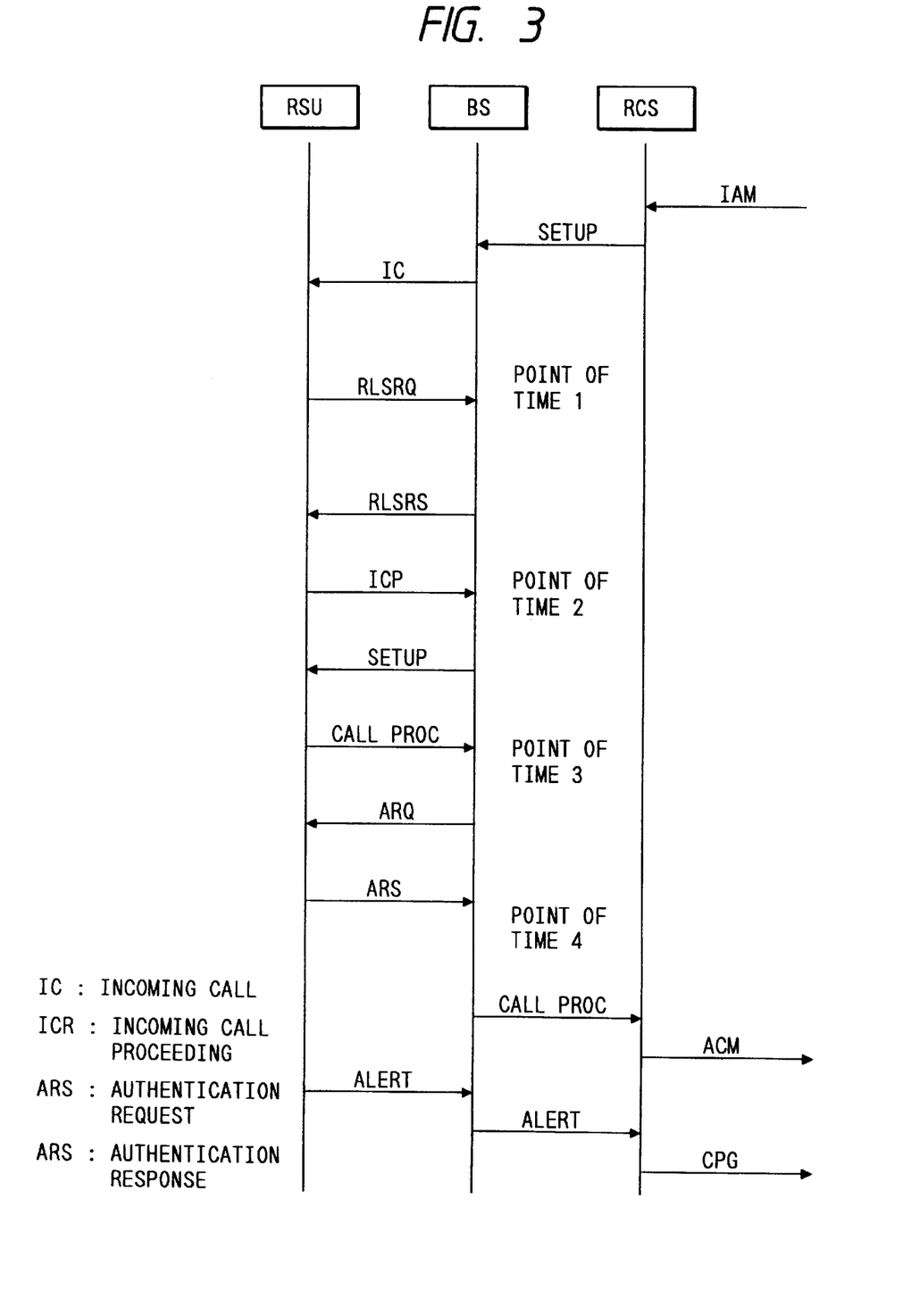
FIG. 3 is a sequence chart for illustrating another example of the incoming-call control sequence to be performed by the radiotelephone system of FIG. 1.

Meanwhile, in case of the embodiment described hereinabove, as a prerequisite for the acquisition of a channel, a judgement on whether or not the radio subordinate unit 11 is present in the area belonging to the base station 7 is made when the base station 7 receives the radio link setup request message (sequence 48). However, such a judgement may be made at the following three points of time of an additional procedure of FIG. 4. Namely, a point of time 2 of FIG. 3 is a point of time when the base station 7 receives an incoming-call response message transmitted by the radio subordinate unit 11 as a logical response to an incoming-call message when the unit 11 receives a radio link setup response message sent from the base station 7 thereto. Further, a point of time 3 of FIG. 3 is a point of time when the base station 7 receives a call proceeding message sent back from the radio subordinate unit 11 when the unit 11 receives a setup message transmitted, for the purpose of performing a call setup, by the base station 7 thereto after the base station 7 receives an incoming-call response message. Moreover, a point of time 4 of FIG. 3 is a point of time when the base station 7 receives an authentication response message sent from the radio subordinate unit 11 when the unit 11 receives an authentication request message transmitted by the station 7 thereto after the station 7 receives a call proceeding message. As the operation proceeds to the step of the transmission/reception of the authentication response message from that of the transmission/reception of the radio link setup response message, the certainty of the presence of the radio subordinate unit 11 is increased gradually. Furthermore, the later the acquisition of a circuit communication channel is performed, the usage efficiency of the circuit is increased.

As described above, in case of the system of the present invention, the acquisition of a communication channel is performed when it is judged that the radio subordinate unit 11 is present in the area belonging to the base station. Further, there has been developed the following method for increasing the circuit-speech-channel acquisition probability at that time. Namely, when receiving the setup message from the radio control portion 4, the communication channel management unit 20 accesses the management table. Further, if the ratio of the number of idle channels to the number of all communication channels is greater than a predetermined value, for example, 70%, the unit 20 judges that the usage efficiency of the circuit communication channels is low, and a communication channel is acquired immediately after that. Incidentally, the predetermined value may be suitably set as necessary. Thus, in accordance with this method, an idle communication channel is immediately acquired without delay even in case that there is almost no possibility of the blockade of all communication channels (namely, there are a sufficient number of idle communication channels). Thereby, the connection of the system with a communication channel can be achieved surely.

Alternatively, when receiving the setup message from the radio control station 4, the communication channel management unit 20 may temporarily acquire a circuit communication channel for a predetermined period of time and moreover release this circuit communication channel if no radio link setup request message is sent from the radio subordinate unit within this predetermined period of time. Namely, after the temporary acquisition, the base station 7 transmits a setup message to the radio subordinate unit 11 and subsequently, the unit 11 transmits a radio link setup request message usually. However, if no radio link setup request message is transmitted by the radio subordinate unit 11 and thus it is not determined within the predetermined period of time (hereunder sometimes referred to as the temporary acquisition period) whether or not the unit 11 is present in the area, a timer counts out the predetermined period of time. In response to this, the communication channel management unit 20 releases the circuit communication channel again. The incoming call is, however, maintained without acquiring a communication channel. Further, the system awaits a decision over the presence of the radio subordinate unit in the area. In such a case, the temporary acquisition period is set to be fully shorter than a period of time (for instance, 10 seconds) required for putting back to a null state of the radio subordinate unit 11 and in the base station 7. In case where a radio subordinate unit is present actually in an area belonging to a base station, it is usually within 3 seconds or so that the actual presence of the radio subordinate unit is known. Thus, the prevention of unnecessary occupation of a communication channel, as well as the increase in the circuit-speech-channel acquisition probability, can be well achieved by temporarily acquiring the communication channel for the temporary acquisition period (for instance, 3 seconds).

Further, regarding this temporary acquisition, the system can provide a fully useful service if the circuit communication channel management unit 20 makes a judgment on whether or not a temporary acquisition of a communication channel is performed, by referring to data representing service class ranks stored in the data base of the mobile location information portion 2. This will be described in detail hereinbelow. In case of this embodiment, as illustrated in FIG. 7(C), a priority is registered in the column "SERVICE CLASS RANK" of the data base, correspondingly to each of the radio subordinate units. This priority has two levels, namely, "1" and "2". For example, if an incoming call to a radio subordinate unit having the priority "1" competes with another incoming call to another radio subordinate unit having the priority "2", the radio subordinate unit having the priority "1" acquires a communication channel preferentially. Conversely, in such a case, a radio subordinate unit having the priority "2" falls behind a radio subordinate unit having the priority "1". Moreover, in case where incoming calls sent to radio subordinate units having a same priority (for instance, the priority "2") compete with each other, an incoming call received by the station earlier than the other incoming call acquires a communication channel preferentially.

By way of example, an operation of the system in case where a setup message is sent from the radio control station 4 to the radio subordinate unit 11 registered as having the priority "1" will be described in detail hereunder. In case of the embodiment of FIG. 2, the radio control station 4 notifies the base station 7 of a setup message which includes service class rank information representing the priority "1" or "2" (in this case, the represented priority is "1"). Because the priority represented by the service class rank information is "1", if there is an idle communication channel registered in the management table, the communication channel management unit 20 immediately performs the temporary acquisition of the communication channel. Thus, even if an incoming call to another radio subordinate unit having the priority "2" occurs until it is definitely known that the radio subordinate unit 11 is present in the area corresponding to the base station 7, the communication channel is acquired for the call to the radio subordinate unit having the priority "1" preferentially without being snatched by the call to the unit having the priority "2".

Next, an operation of the system will be described concerning a case that there is an incoming call to the radio subordinate unit 11 registered as having the priority "2". In this case, when knowing that the called unit 11 has the priority "2", the communication channel management unit 20 does not perform the temporary acquisition but transmits a setup message to this radio subordinate unit 11. If an incoming call to another radio subordinate unit having the priority "1" occurs until it is judged that the unit 11 having received the setup message is present in the corresponding area, the temporary acquisition of a communication channel by the radio subordinate unit having the priority "1" is immediately performed. Further, if an incoming call to another radio subordinate unit having the priority "2" occurs until it is judged that the unit 11 having received the setup message is present in the corresponding area, a communication channel is acquired for the radio subordinate unit, the presence of which is known earlier than that of the other subordinate unit. Incidentally, the point of time, at which it is definitely judged that the radio subordinate unit 11 is present in the corresponding area, is a point of time, at which one of a radio link setup request message, an incoming-call response message, a call proceeding message and an authentication response message is received by the base station, as described above.

As described above, in case of the embodiment of FIG. 2, the service class rank information is contained in the setup message sent from the radio control station 4 to the base station 7. However, there is another method in which the service class rank information is not included in the setup message. Namely, in case of this method, when the base station 7 receives the setup message from the radio control station 4, the communication channel management unit 20 transmits a service class rank confirmation message to the mobile location information portion 2 of the mobile location management station 1. When receiving this message, the mobile location management station 1 retrieves the service class rank information stored in the data base of the mobile location information portion 2. Thereafter, the station 1 transmits a service class rank confirmation response message representing a result of the retrieval to the base station 7. Then, the communication channel management unit 20 determines on the basis of this service class rank confirmation response message whether or not a temporary acquisition of a communication channel should be performed. Thus, a fully useful service can be provided without causing unnecessary occupation of circuit communication channels by taking the service class rank information stored in the data base of the mobile location information portion 2 of the mobile location management station 1 into consideration.

As explained hereinbefore, in accordance with the method for managing communication channels of a mobile telecommunications system and the radiotelephone system for use therein according to the present invention, a communication channel is acquired efficiently only by a base station governing a (radio) area in which a called radio subordinate unit is present actually. Thus, the circuit usage efficiency of the entire system can be increased extremely. Therefore, the present invention can prevent the occurrences of troubles which would occur in case of using the conventional systems (incidentally, an example of such a trouble is a situation in which a transmission or reception of a call, which a user wishes to make, can not be achieved due to the fact that any communication channel is busy). Consequently, the serviceability of the system can be improved very much. Moreover, in case of the system according to the present invention, the selection of a communication channel to be acquired, as well as the determination of a point of time, at which a communication channel is acquired, is performed in the base station at the initiative thereof (namely, the base station performs an active speech-channel management). Thus, the control operation effected by the entire system can be prevented from becoming so complex as in the conventional cases where the communication channels are managed by the radio control station, the gateway control station or the like. As a consequence, the processing performed by the entire system can be simpler. Thus, the efficiency of operations performed by the system (namely, the performance of the system) can be increased. Furthermore, in case of the system according to the present invention, a communication channel is temporarily acquired by taking the service class rank information stored in the data base of the mobile location information portion of the mobile location management station into consideration. Thus, further fully useful service can be provided by the system. Additionally, the sureness of the connection of the system with a communication channel can be increased.

While the preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A method for managing a digital radiotelephone system, comprising the steps of:

transmitting an incoming call signal to a called radio subordinate unit through a radio transmission/reception portion of a radio interface unit by use of a control unit of a base station without performing an acquisition of a digital wire circuit communication channel between a radio control station and the base station when the base station receives a call setup message sent from the radio control station for the called radio subordinate unit through a circuit-control-channel control portion of a circuit interface unit, the call setup message passing through a digital wire circuit;

acquiring the digital wire circuit communication channel between the radio control station and the base station by use of a communication channel management unit, at a moment at which it is known that the called radio subordinate unit is present in a radio area of the base station; and connecting the base station and the called radio subordinate unit through a radio communication channel after the acquisition of the digital wire circuit communication channel.

2. A method for managing a digital radiotelephone system according to claim 1, wherein the moment, at which it is known that the called radio subordinate unit is present in the radio area of the base station, is a moment at which a radio link setup request message is issued from the called radio subordinate unit to establish a communication channel for transmitting a logical message on the radio communication channel.

3. A method for managing a digital radiotelephone system according to claim 1, wherein the moment, at which it is known that the called radio subordinate unit is present in the radio area of the base station, is a moment at which an incoming call response is issued from the called radio subordinate unit in response to the incoming call signal.

4. A method for managing a digital radiotelephone system according to claim 1, wherein the moment, at which it is known that the called radio subordinate unit is present in the radio area of the base station, is a moment at which a call proceeding message is issued from the called radio subordinate unit to the base station for performing a call setup after the base station receives an incoming call response message.

5. A method for managing a digital radiotelephone system according to claim 1, wherein the moment, at which it is known that the called radio subordinate unit is present in the radio area of the base station, is a moment at which an authentication response message is issued from the called radio subordinate unit to the base station for performing a call setup, after the base station receives an incoming call response message and an authentication request message is transmitted from the base station to the called radio subordinate unit.

6. A method for managing a digital telephone system according to claim 1, wherein the acquiring the digital wire circuit communication channel comprises the steps of:

judging s number of idle circuit communication channels among digital wire circuit communication channels in the communication channel management unit when the base receives the call setup message, and acquiring the digital wire circuit communication channel when the communication channel management unit judges that a ratio of the number of idle circuit communication channels to the number of the digital wire circuit communication channels is larger than a prescribed ratio.

7. A method for managing a digital radiotelephone system, comprising the steps of:

temporarily acquiring a particular digital wire circuit communication channel among a plurality of digital wire circuit communication channels between a radio control station and a base station during a temporary acquisition period when the base station receives a call setup message sent from the radio control station for a called radio subordinate unit through a circuit-control-channel control portion of a circuit interface unit, the call setup message passing through the particular digital wire circuit communication channel;

transmitting an incoming call signal from the base station to the called radio subordinate unit through a radio transmission/reception portion of a radio interface unit during an incoming call maintaining period when the base station receives the call setup message, the temporary acquisition period being shorter than the an incoming call maintaining period;

releasing the particular digital wire circuit communication channel temporarily acquired in cases where it is not known within the temporary acquisition period whether or not the called radio subordinate unit is present in a radio area of the base station; and fixedly acquiring the temporarily acquired particular digital wire circuit communication channel through a communication channel management unit at a moment at which it is known within the temporary acquisition period that the called radio subordinate unit is present in the radio area of the base station.

8. A method for managing a digital radiotelephone system according to claim 7, wherein the step of temporarily acquiring a particular digital wire circuit communication channel further comprises the step of:

setting the priority of the called radio subordinate unit to a high priority or a low priority; and temporarily acquiring the particular digital wire circuit communication channel in cases where the call setup message is sent for the called radio subordinate unit of which the priority is set to the high priority.

9. A digital radiotelephone system comprising:

a circuit interface unit having a circuit-control-channel control portion for transmitting and receiving pieces of control data to/from a radio control station through a control channel of a digital wire circuit under control of the circuit-control-channel control portion and transmitting and receiving pieces of voice data to/from the radio control station through a digital wire circuit communication channel of the digital wire circuit;

a radio interface unit having a radio control channel control portion and a radio transmission/reception portion for transmitting pieces of voice data and pieces of control data as radio waves from the radio transmission/reception portion to a radio subordinate unit through a control channel and a radio communication channel of a radio circuit, receiving pieces of voice data and pieces of control data sent from the radio subordinate unit to the radio transmission/reception portion as electric signals through the control channel and the radio communication channel of the radio circuit, and controlling the control data transmitted on the control channel of the radio circuit between the radio subordinate unit and the radio transmission/reception portion in the radio control channel control portion;

a time switch unit for performing a switching operation for the digital wire circuit communication channel and the radio communication channel to perform an up-stream communication from the radio interface unit to the circuit interface unit or a downstream communication from the circuit interface unit to the radio interface unit;

a control unit for controlling the circuit interface unit according to the control data transmitted or received under control of the circuit-control-channel control portion, for controlling the radio interface unit according to the control data transmitted or received under control of the radio control channel control portion and for controlling the time switch unit to control transmission of a call to the radio subordinate unit and reception of a call from the radio subordinate unit, and for controlling the radio control channel control portion of the radio interference unit to connect the radio subordinate unit and the radio transmission/reception portion through the radio communication channel after acquisition of the digital wire circuit communication channel; and a communication channel management unit for managing the digital wire circuit communication channel by transmitting an incoming call signal to the radio subordinate unit through the radio transmission/reception portion of the radio interface unit without performing an acquisition of the digital wire circuit communication channel when receiving a call setup message sent from the radio control station for the radio subordinate unit through the circuit-control-channel control portion of the circuit interface unit, and by acquiring the digital wire circuit communication channel at a moment at which it is known, according to control data transmitted from the radio subordinate unit to the radio interface unit, that the called radio subordinate unit is present in a radio communication area.

10. A method for managing a digital radiotelephone system according to claim 7, wherein the moment, at which it is known that the called radio subordinate unit is present in the radio area of the base station, is a moment at which a radio link setup message is issued from the called radio subordinate unit for establishing a communication channel to transmit a logical message on the radio communication channel.

11. A method for managing a digital radiotelephone system according to claim 7, wherein the moment, at which it is known that the called radio subordinate unit is present in the radio area of the base station, is a moment at which an incoming call response is issued from the called radio subordinate unit as a logical response to the incoming call signal.

12. A method for managing a digital radiotelephone system according to claim 7, wherein the moment, at which it is known that the called radio subordinate unit is present in the radio area of the base station, is a moment at which a call proceeding message is issued from the called radio subordinate unit to the base station for performing a call setup after the base station receives an incoming call response message.

13. A method for managing a digital radiotelephone system according to claim 7, wherein the moment, at which it is known that the called radio subordinate unit is present in the radio area of the base station, is a moment at which an authentication response message is issued from the called radio subordinate unit to the base station for the purpose of performing a call setup after the base station receives an incoming call response message and an authentication request message is transmitted from the base station to the called radio subordinate unit.

14. In a digital radiotelephone system including a digital wire circuit including control channels and communication channels, a radio circuit including control channels and communication channels for signals transmitted in radio waves, a radio control station, a base station and a radio subordinate means, the base station communicating with the radio control station via the wire circuit and communicating with the radio subordinate means via the radio circuit, the improvement comprising:

circuit interface means, including a wire control-channel control means for transmitting control data to and from the radio control station through a control channel of the digital wire circuit, and for transmitting voice data to and from the radio control station through a communication channel of the digital wire circuit;

radio interface means, including a radio control-channel control means and a radio transmission means for transmitting voice data and control data as radio waves from and to the radio transmission means to and from the radio subordinate means, through a control channel and a radio communication channel of the radio circuit, wherein the radio control-channel control means controls the control data transmitted on the control channel of the radio circuit between the radio subordinate means and the radio transmission means;

time switch means for performing a switching operation for the digital wire circuit communication channel and the radio communication channel to provide an up-stream communication from the radio interface means to the circuit interface means and a down-stream communication from the circuit interface means to the radio interface means;

further control means for controlling the circuit interface means according to the control data transmitted or received under control of the circuit-control-channel control means, for controlling the radio interface means according to the control data transmitted or received under control of the radio control channel control means and for controlling the time switch means to control transmission and reception of a call to and from the radio subordinate means and for controlling the radio interface means to connect the radio subordinate means and the radio transmission means of the radio interface means through the radio communication channel of the radio circuit after acquisition of the digital wire circuit communication channel; and a communication channel management means for managing the digital wire circuit communication channel by transmitting an incoming call signal to the radio subordinate means through the radio transmission means of the radio interface means without performing an acquisition of the digital wire circuit communication channel when receiving, via a control channel of the digital wire circuit, a call setup message sent for the radio subordinate unit from the radio control station by the wire control-channel control means of the circuit interface means, and by acquiring the digital wire circuit communication channel at a moment at which it is known, according to control data transmitted from the radio subordinate means to the radio interface means, that the called radio subordinate means is present in a radio communication area.

* * * * *